United States Patent [19]
Kleinert

[11] 3,769,039
[45] Oct. 30, 1973

[54] PROCESS FOR FABRICATING LIQUID-FILLED CHOCOLATE PRODUCTS WITH AN INNER CRUST

[75] Inventor: Jürg Kleinert, Kilchberg, Switzerland

[73] Assignee: Chocoladefabriken Lindt & Sprungli Aktiengesellschaft, Kilchberg, Switzerland

[22] Filed: Sept. 15, 1971

[21] Appl. No.: 180,664

[30] Foreign Application Priority Data
Sept. 22, 1970 Switzerland..................... 14024/70

[52] U.S. Cl.................. 426/282, 426/289, 426/306, 426/380, 426/302
[51] Int. Cl............................ A23l 1/26, A23l 1/20
[58] Field of Search....................... 99/134 R, 138 R

[56] References Cited
UNITED STATES PATENTS
2,682,471    6/1954    Alther............................... 99/138 R
3,496,886    2/1970    Fohr.................................. 99/134 R
3,574,639    4/1971    Forkner.............................. 99/134

*Primary Examiner*—Alvin E. Tanenholtz
*Assistant Examiner*—J. M. Hunter
*Attorney*—Werner W. Kleeman

[57] ABSTRACT

A method of fabricating chocolate products filled with a sugar-containing, especially also alcohol-containing liquid fill, a sugar crust layer being present between the outside chocolate casing and the liquid core, and wherein the inner wall of a hollow mold formed of chocolate is provided with sugar inoculation crystals separated from one another by fat particles. The liquid fill is then introduced into the chocolate mold, this liquid fill being over-saturated with sugar at room temperature. There is applied to the surface of the liquid fill an inoculation crystal and fat containing mass, and then this mass is covered with a chocolate base layer.

16 Claims, 3 Drawing Figures

PATENTED OCT 30 1973

INVENTOR.

BY

PROCESS FOR FABRICATING LIQUID-FILLED CHOCOLATE PRODUCTS WITH AN INNER CRUST

BACKGROUND OF THE INVENTION

The present invention relates to a new and improved process for the fabrication of chocolate products, for instance, of the type commonly referred to in the United States as bonbons and in Europe as pralinés, filled with a sugar-containing liquid, and wherein there is present a sugar crust layer between the chocolate housing and the liquid core. The process of this invention has particular utility in the fabrication of products containing an alcohol filling, although not strictly limited to this type of product fill.

The prior art is familiar with the technique of fabricating products of the character described above in accordance with the so-called power molding method. According to that procedure there is initially produced a warm over-saturated, as a general rule, alcohol containing-sugar solution and such is then poured into molds formed by depressions in a layer of starch powder. After pouring the solution into the powder molds, the surface of the solution is covered with further starch powder. The entire structure is then permitted to stand for a number of days. As a result, there is formed in the powder mold a body consisting of crystallized sugar internally containing the liquid fill. After blowing-off the powder dust by means of air, the thus formed sugar body is transferred to a conveyor band, then enveloped in a chocolate mass according to known procedures.

Now this prior art technique requires a great expenditure of time and work, furthermore, is associated with quite a bit of manual labor. Additionally, it is only capable of producing very irregular crusts, resulting in a relatively large number of rejects because of breakage of the crust of the sugar bodies. It is for these reasons that attempts have been made to replace the powder molding technique discussed above by other more automated or machine-bound procedures.

Hence, British Pat. No. 1,172,417 initially refers therein to the above described powder casting technique as constituting part of the state-of-the-art. The procedure contemplated by that patent is manifested by the features that, there is produced a warm, saturated, sugar solution containing aromatic constituents, for instance distilled alcohol. This warm solution is cooled to a temperature beneath the saturation point, and specifically is cooled so rapidly that prior to the time that the solution is poured into molds, no crystallizing out of the sugar yet takes place. Then molds, for instance hollow chocolate molds, are filled with this cooled liquid.

Although this technique does indeed constitute a saving in personnel, still it does not overcome the need to provide a certain amount of storage time for the filled hollow bodies which, as was heretofore the case, still require storage for a number of days, usually at least 2 to 3 days. Additionally, the filled molds have to be turned during storage for the purpose of forming a uniform crust. Further, this technique requires a relatively expansive and complicated cooling installation, since cooling must proceed very rapidly. Acquisition and operation of such installations is extremely expensive. Finally, the forming of the sugar crust is dependent upon a number of incidentals, for instance, the presence of materials in the solution which form seed crystals or crystal nuclei, something which is not always known and eludes controls.

British Pat. No. 1,198,386 only relates to the encasing of conventionally produced liquid-filled sugar bodies with an outer layer formed of gelatine and sugar before the outer skin formed of chocolate has been applied. Therefore, this technique is really only directed to a modification of the power molding technique and simply adds a further process step thereto.

OBJECTS OF THE INVENTION

Hence, form what has ben stated above, it will be seen that the prior art is still in dire need of an improved method for fabricating liquid-filled chocolate products with an inner crust in a manner not associated with the aforementioned limitations and drawbacks of the heretofore known procedures. Hence, a paramount objective of this invention is to provide just such method of fabricating these liquid-filled chocolate products in a manner effectively overcoming the aforementioned drawbacks and limitations and reliably fulfilling the existing need in the art.

Another and more specific object of the present invention is directed to a rational and relatively high-speed process for fabricating such liquid-filled chocolate products, predicated upon the simple shell molding technique (Moulé-technique) but affording decisive improvements over the known techniques and delivering completely new and advantageous products.

Still a further significant object of the present invention relates to a completely novel process for fabricating liquid-filled chocolate products in an economical and rational manner, considerably eliminating the product breakage explained above as known in the prior art manufacturing processes, and extensively improving upon the economies of the prior art manufacturing techniques used in the fabrication of such type products.

Yet a further significant object of the present invention relates to a completely novel technique for fabricating liquid-filled chocolate products with an inner crust, minimizing product storage time during manufacture, in fact, reducing such down to a value which considerably improves upon the manufacturing economies, substantially eliminating product rejects since there is provided a much more positive and controlled way of producing the sugar containing-crystallized crust encasing the liquid fill, and generally lending itself to mass production techniques on a relatively high speed basis.

Another significant object of the present invention is to provide a novel method of fabricating liquid-filled chocolate products in a safe, economical and rational manner and affording a considerable reduction in the operating procedures and times in contrast to those previously employed in the art for achieving the same end, while also bringing about an appreciable reduction in the amount of personnel required for producing such type chocolate products.

DETAILED DISCUSSION OF THE INVENTIVE PROCESS

A basic aspect of the novel process of this development is predicated upon exactly controlling the crystallization of the sugar. If it is possible to control this phenomenon, then a large number of advantages can be realized, which are also beneficial for the inventive process and which will be considered more fully hereinafter.

Now, in order to implement the above objects, and still further objects of the invention which will become more readily apparent as the description proceeds, the process of this invention is manifested by the features that the inner wall of a chocolate mold is provided with sugar inoculation crystals separated from one another by fat particles. Thereafter, a sugar-containing, preferably likewise alcohol-containing liquid is filled into the thus prepared chocolate mold, this liquid fill is over-saturated sugar in regard to room temperature. Then an inoculation crystal-containing and fat-containing mass is applied to the surface of the liquid fill, and this mass is then covered with a base layer formed of chocolate.

The inoculation crystals can be introduced into the hollow chocolate mold in a number of different ways. For instance, it is possible to pour or spray into the mold an alcoholic inoculation crystal suspension. If this is done, then the chocolate still should be soft or plastic so that the inoculation crystals can fixedly imbed themselves into the wall of the mold. According to a particularly preferred teaching, the chocolate mold is filled with a warm inoculation crystal mass consisting of inoculation crystals and fat, and if desired, further containing a chocolate mass. This inoculation crystal mass can be also sprayed into the mold. Also here it is preferred to work with a still warm chocolate mold, that is to say, the inoculation crystal layer is applied before the chocolate mass forming the chocolate mold has completely solidified, thereby affording a good bond and a nondiscernible transition between the inoculation layer and the outer shell or casing.

The above-mentioned addition of the chocolate mass to the inoculation crystal mass serves for coloration purposes.

The inoculation crystal mass generally has the following composition:

a. vegetable fat, preferably cocoa butter, 30–50 parts by weight b. fine crystalline sugar, grain size 0.1–1 mm. 40–60 parts by weight c. cocoa mass.

The thickness of the inoculation crystal layer amounts to approximately 0.05 to 1 mm., preferably 0.1 to 0.5 mm.

In the thus prepared mold provided with the inoculation layer, there is now poured-in the liquid fill. This liquid fill can be introduced in cold or warm condition. When poured in warm, there is formed a particularly dense, fine crystalline barrier layer of sugar.

After pouring-in the sugar-containing and as a general rule alcohol-containing fill or filling, and as soon as the corresponding saturation temperature has been reached, there begins the crystallization of the sugar at the inoculation layer. It has been found that this crystallization proceeds with a great speed, beyond that which was ever heretofore observed with other techniques, and produces a dense, impervious, completely uniform sugar barrier layer which can be controlled in its thickness. This sugar barrier layer protects the outside chocolate from attack by the components of the liquid filling, especially from attack by the alcohol and/or ethereal oils.

It has been observed that at 20° C. the formation of the barrier layer occurs quite soon, after four hours it is really noticeable, and at most after 24 hours has been completed. No special cooling installations are required.

On the other hand, formation of this barrier layer can be accelerated by cooling, so that for the first time it is possible to provide a completely continuous mode of operation without any residence stages.

Surprisingly, it is necessary that the sugar crystals are separated from one another at the inoculation layer by a fat, especially cocoa butter. Only in this case is there formed the high-grade, homogeneous sugar barrier layer of small sugar crystals. It is postulated that probably the fat prevents the formation of larger sugar crystals which would not produce any dense barrier layers.

The time course of the formation of the barrier layer is markedly dependent upon the sugar concentration of the fill. Of course, it is a prerequisite of the method of this development that at 20° C. over-saturated sugar solutions must be employed. If the fill contains alcohol then the solubility of sugar is below the solubility in pure water, which at 20° C. amounts to 66.6 percent by weight. A liquid fill containing approximately 11 percent by weight alcohol should contain at least 50 percent by weight, preferably 62 to 67 percent sugar (sucrose). Solutions with sugar contents up to 75 percent can still be processed.

The thickness of the barrier layer can be controlled by regulating the over-saturation present at the liquid fill. As soon as namely there has been formed a saturated sugar solution from the over-saturated solution by the crystallizing-out of the sugar in the form of the barrier layer, further separation-out of the sugar is stopped. As already mentioned, the sugar concentration of saturated solutions is dependent upon the composition of the aqueous phase: the presence of alcohol, ethereal oils and so forth reduce the solubility of the sugar.

To produce the hollow molds, it is possible to use any desired chocolate mass, such as milk chocolate, bitter chocolate, mocca chocolate and so forth. In order that the chocolate will exhibit a certain plasticity even after solidification, so as to prevent the formation of fissures or hairline cracks during storage, it should contain, apart from the cocoa butter, a plasticizing fat, especially butter or butter lard, in quantities ranging from 1 to 5 percent by weight, preferably approximately 3 to 4 percent by weight.

Now, in the context of this application, the term "sugar" should be understood to encompass both raw sugar and beet sugar (sucrose) as well as those crystallizing, white, soluble, sweet tasting, directly or indirectly fermenting carbohydrates designated as sugars in the broadest sense, such as for instance glucose or grape sugar, fructose or fruit sugar, lactose or milk sugar, malt sugar or the like.

BRIEF DESCRIPTION OF THE DRAWINGS

Having now had the benefit of the foregoing discussion of the process aspects of this development, there will now be described an exemplary form of production process for these liquid-filled chocolate products produced by this invention in conjunction with the accompanying drawings, wherein.

DETAILED DESCRIPTION OF THE PRODUCTION TECHNIQUE ON THE
BASIS OF THE ACCOMPANYING DRAWINGS

Figure 1:
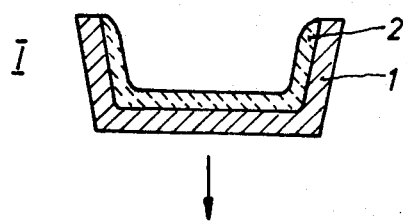
FIG. 1 illustrates the individual process steps carried out during the manufacturing operation.
Figure 1:
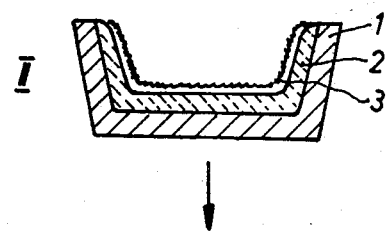
Figure 1:
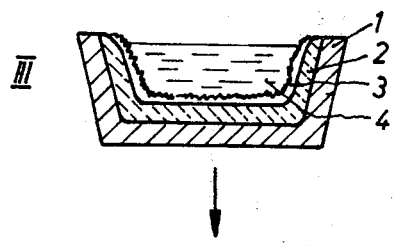

Describing now the drawings and considering initially FIG. 1 it will be understood that into a metal mold 1 there is poured according to known techniques (warm pouring, turning and outflow, and if desired repeating these steps) a chocolate mass consisting of 50 parts cocoa mass (ground seed leaf of the cocoa seed), 37 parts sugar, 12.7 parts cocoa butter, 3.5 parts butter lard and 0.3 parts lecithin. At this point it is mentioned that as used hereinafter the terms "parts" and "percent" refer to parts by weight and percent by weight, respectively, in the event no other indication is given. Owing to the aforedescribed operation there is obtained a chocolate layer 2, as best seen in the uppermost illustration of FIG. 1, labelled by reference character I and referring to the first operational stage. As a convenience in the description each subsequent stage bears the next larger reference character, such as II, III, IV and V.

During stage II of the inventive process there is applied the inoculation layer. To this end there is introduced into the still warm chocolate mass 2 a liquid mass produced by mixing while in hot condition the following:

5.0 parts chocolate bass mass (for instance according to the above composition);
45.0 parts cocoa butter; and
50.0 parts fine crystal refined sugar, grain size 0.3 – 0.6 mm,
water content less than 0.04 percent
Another possible composition is:
20.0 parts cocoa mass;
34.0 parts cocoa butter; and
46.0 parts fine sugar (grain size 0.1 – 0.2 mm).

The excess of this hot mass is poured out by turning the mold 1 and there is obtained the intermediate product depicted in stage II, consisting of the chocolate layer 2 coated with the inoculation layer 3. The layer thickness of the inoculation mass can be varied by the viscosity and residence time of the inoculation mass in the chocolate shell or mold. As a rule the thickness is in the range of 0.2 – 0.6 mm.

After complete solidification of the mold content there is introduced the liquid fill 4 as indicated in stage III, and the production of which will be described more fully hereinafter in conjunction with FIG. 3. In the example under consideration such will be assumed to consist of a cognac containing-sugar solution containing 65 – 66 percent dry mass (sugar) and 11.5 – 11.8 pure alcohol, density amounting to approximately 1.266 g/ml at 20° C, viscosity 780 cP at 10° C. This liquid fill 4 is introduced at a temperature of 30° – 36° C., but could also be processed at lower temperature. There is obtained the intermediate product indicated at stage III containing the chocolate layer 2, the inoculation layer 3 and the liquid fill 4. It is preferred if the liquid fill is practically free from separated out sugar crystals.

During stage IV there is sprayed in a liquid condition upon the surface of the liquid fill 4 an approximately 0.1 to 1 mm. thick inoculation layer 5 of the above composition at a temperature of 36° c.

Before any further processing is undertaken the inoculation layer applied during stage IV should be caused to contract somewhat by being subject to a protective cooling, whereby there is however prevented any complete solidification. Thereafter, the inoculation layer 5 thus applied is covered during stage V by pouring thereon a warm chocolate mass 6. In this connection there is used the same mass of chocolate as was used for the production of the hollow chocolate mold.

Figure 2:
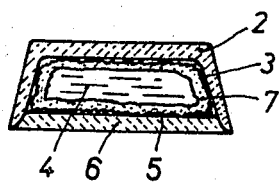
FIG. 2 is a sectional view through a bonbon or praline produced according to the teachings of this invention.
Figure 2:
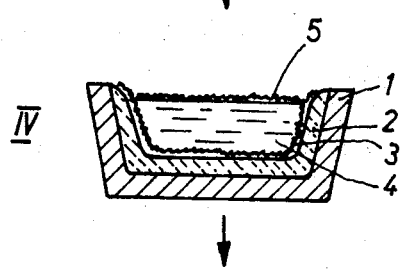
Figure 2:
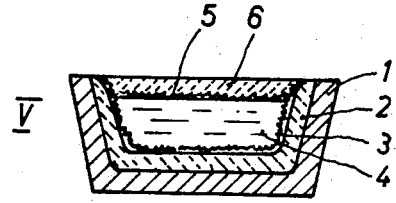

The thus produced closed bodies can now be completely molded or formed following cooling, which is protectively undertaken at a temperature in the range of 18° to 20° C. Then these chocolate products can be packaged on any desired equipment used for this purpose. During cooling there is formed the sugar crust or barrier layer 7, as best seen by referring to FIG. 2. This Figure is a section through a chocolate product produced in accordance with the process of this invention.

It will be seen that this chocolate product comprises the chocolate casing or shell 2 closed at its bottom by the chocolate base layer 6 and containing therein the inoculation layer 3 which is adjacent the wall of the chocolate casing or shell 2, followed by the sugar crust or barrier layer 7 which has formed and containing therein the liquid fill 4.

Figure 3:
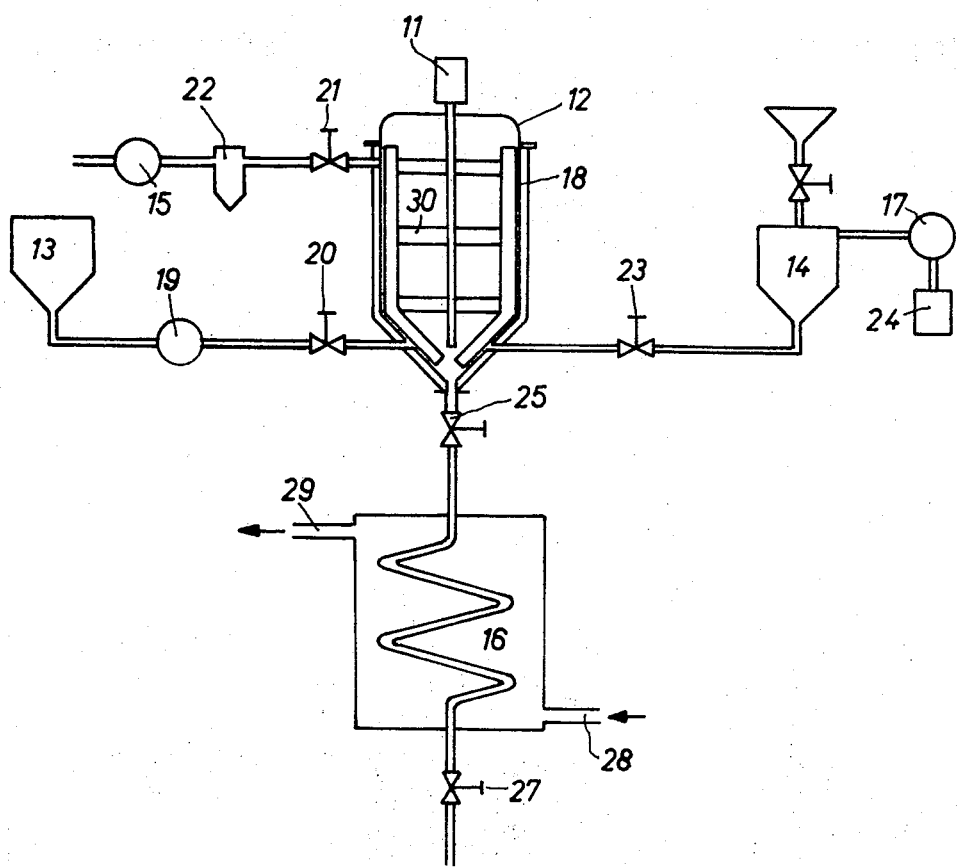
FIG. 3 schematically illustrates a chocolate production system useful in the practice of this invention and specifically details the preparatory-and molding equipment.

Now in FIG. 3 there is illustrated by way of example a schematic diagram of a production installation used for fabricating the liquid fill of the chocolate products produced in accordance with this development. Considering now FIG. 3 more fully it will be seen that there is provided a vacuum cooker 12 which is filled up to approximately three-quarters of its volume with a 62 to 65 percent sucrose solution. This sucrose solution is produced at the vessel 13 and fed into the vacuum cooker 12 through the agency of a pump 19 and the valve 20.

After closing the cock at the valve 20 the cooker 12 is heated by means of the heating jacket 18 and its contents maintained at approximately 90° C. By applying a slight negative pressure, by means of the vacuum pump 15 and the valve 21, the sucrose solution is brought to a sugar content concentration of 84 – 85 percent without stirring. The vaporised water collects at the condenser 22.

During such concentration there is introduced into the supply vessel 14 the required quantity of alcoholic spirits or other desired ingredient in the event that the liquid fill is not one containing alcohol. Here it is to be assumed there is employed a product having alcohol in the amount of 58 percent by volume.

After reaching the desired dry mass content of 80 – 85 percent at the cooker the valve 21 is closed and the air pump 17 is placed into operation, the suction air of which is cleaned at the filter 24. By opening the valve 23 the alcohol is expelled into the cooker 12, and, the stirrer 30 driven by the drive motor 11 is placed into operation. The alcoholic spirits are then homogeneously distributed throughout the sugar solution.

After closing the valve 23 the liquid fill can flow via the discharge valve 25 through a suitable cooler 16. There it is cooled to the desired fill temperature by means of water or a cooling oil introduced at the inlet 28 and withdrawn at the outlet 29. This can be anywhere between approximately 5° C. and the melting point of the used chocolate; preferably there is selected a temperature in the range of 30° - 36° C.

Although by way of illustration the invention has been described in connection with the manufacture of chocolate products in the form of liquid filled bonbons or pralines, other liquid filled chocolate products can be produced, such as chocolate bars or the like.

While there is shown and described present preferred embodiments of the invention, it is to be distinctly understood that the invention is not limited thereto but may be otherwise variously embodied and practiced within the scope of the following claims. ACCORDINGLY,

I claim:

1. A method of fabricating chocolate products filled with a sugar-containing liquid fill, and wherein a sugar crust layer is present between the outside chocolate casing and the liquid core, comprising the steps of providing the inner wall of a hollow mold formed of chocolate with sugar inoculation crystals separated from one another by fat particles and defining a first inoculation layer, then introducing into the chocolate mold, upon said first inoculation layer, the liquid fill which is oversaturated with sugar at room temperature, applying to the surface of the liquid fill a second inoculation layer comprising sugar crystals and fat particles, and then covering this second inoculation layer with a chocolate base layer.

2. The method as defined in claim 1, wherein at least one of said inoculation layers is introduced as a liquid and said fat is vegetable fat.

3. The method as defined in claim 2, wherein said vegetable fat is cocoa butter.

4. The method as defined in claim 2, wherein said sugar possesses a grain size in the range of approximately 0.1 to 1 mm.

5. The method as defined in claim 4, wherein said grain size of the sugar is preferably 0.3 to 0.6 mm.

6. The method as defined in claim 2, wherein said liquid mass further includes a chocolate mass.

7. The method as defined in claim 2, wherein said liquid mass further includes a cocoa mass.

8. The method as defined in claim 2, wherein said inoculation layer comprises 30 to 50 parts by weight cocoa butter as the vegetable fat, 40 to 60 parts by weight fine crystal sugar as the sugar constituent, and further includes 0 to 30 percent by weight cocoa mass.

9. The method as defined in claim 8, wherein the thickness of the inoculation layer is in the range of 0.05 to 1 mm.

10. The method as defined in claim 9, wherein the thickness of such inoculation layer is preferably in the range of 0.1 to 0.8 mm.

11. The method as defined in claim 9, wherein the chocolate of the mold contains butter lard as a plasticizing agent, in an amount ranging from 1 to 5 percent by weight.

12. The method as defined in claim 11, wherein said butter lard preferably is present in an amount ranging from 3 to 4 percent by weight.

13. The method as defined in claim 11, wherein said first and second inoculation layers each possess the same composition.

14. The method as defined in claim 13, wherein said second inoculation layer is applied in a warm condition to the surface of the liquid fill.

15. The method as defined in claim 14, wherein said chocolate base layer has the same composition as the hollow chocolate mold.

16. The method as defined in claim 15, wherein the liquid fill is introduced into the hollow chocolate mold at a temperature in the range of 30° - 36° c.

* * * * *